Jan. 12, 1965   G. W. HOSTETLER ETAL   3,165,164
MOTOR VEHICLE RADIATOR MOUNTING MEANS
Filed Dec. 7, 1961   2 Sheets-Sheet 2
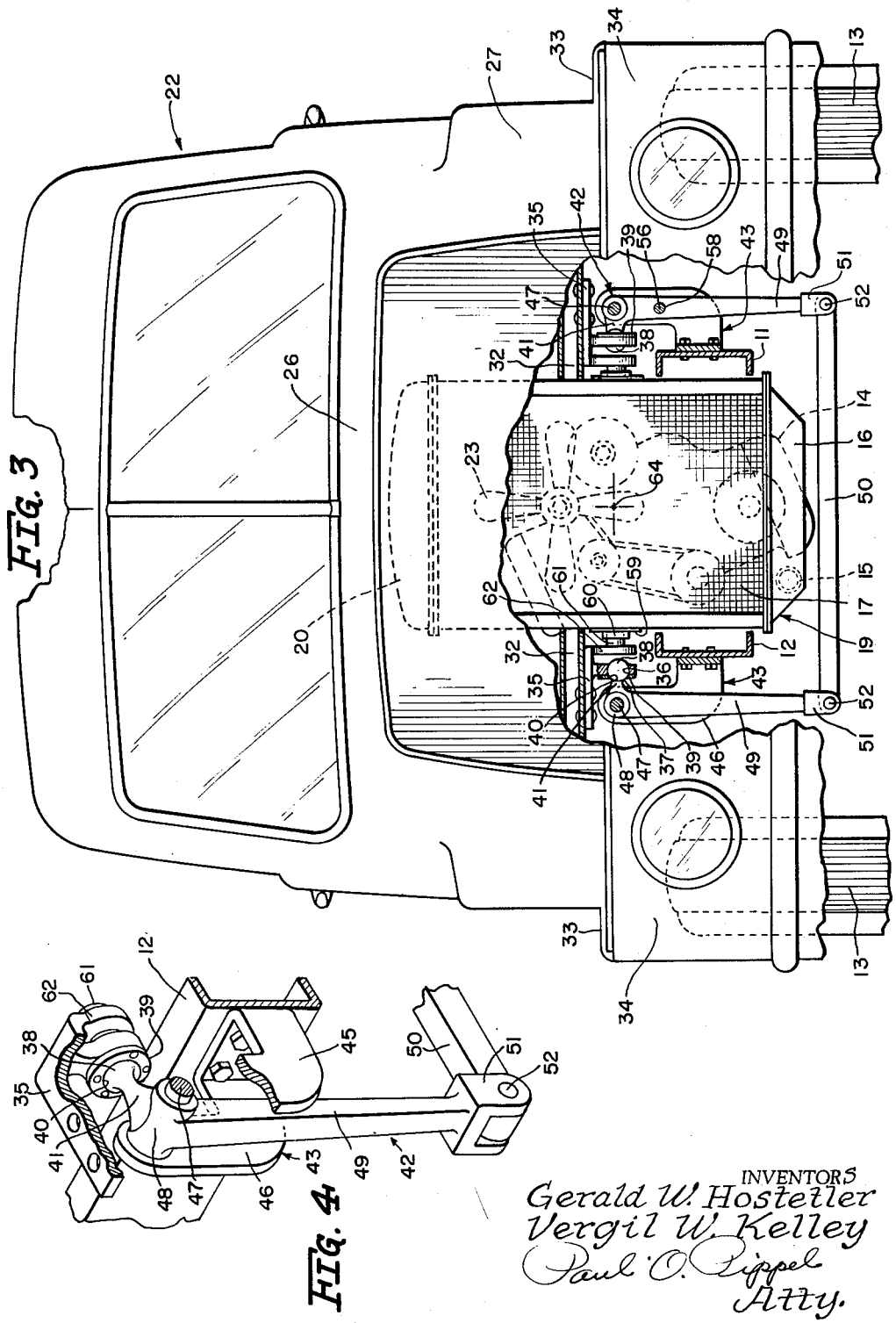
INVENTORS
Gerald W. Hostetler
Vergil W. Kelley
Paul O. Pippel
Atty.

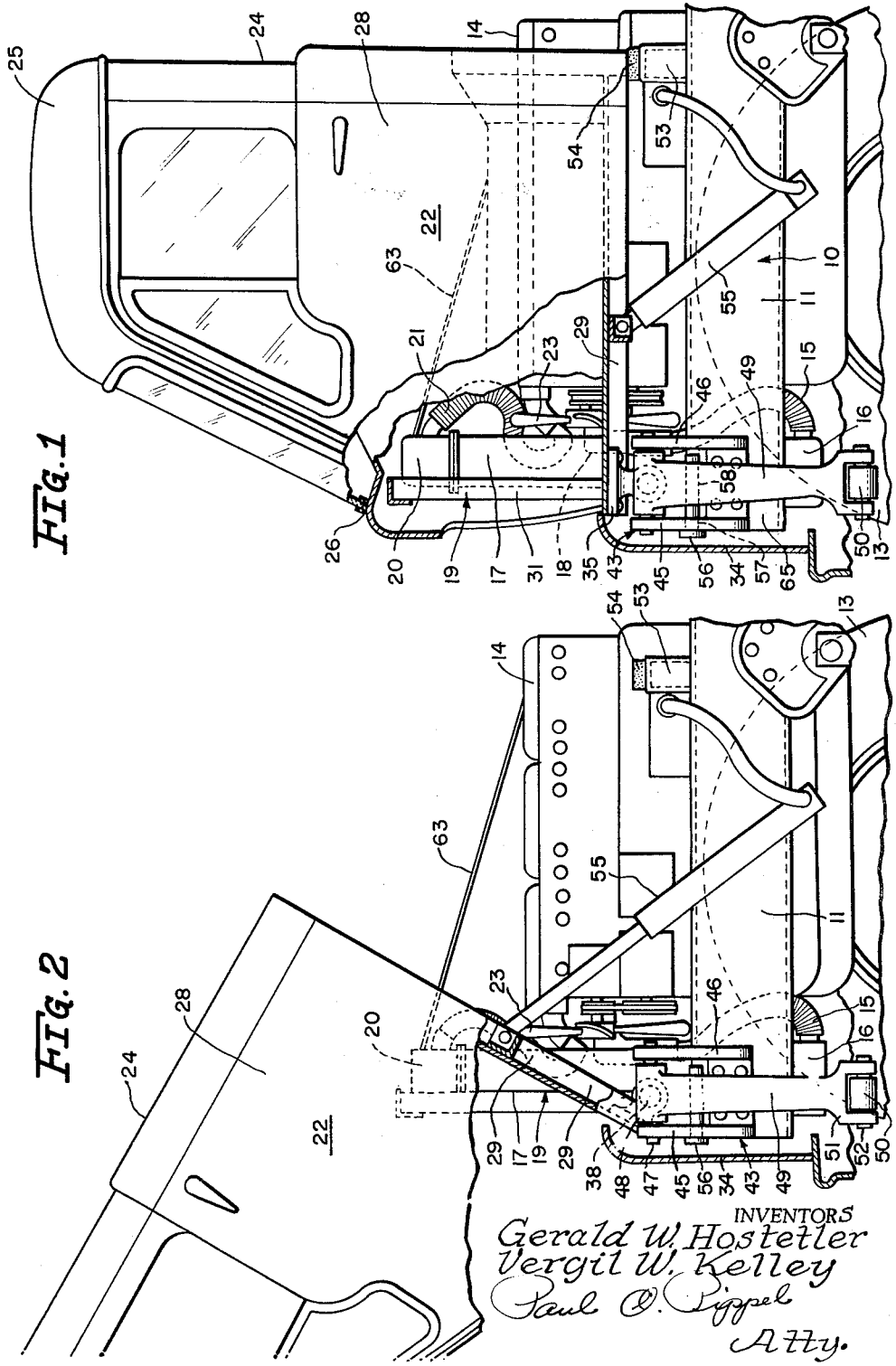

United States Patent Office 3,165,164
Patented Jan. 12, 1965

3,165,164
MOTOR VEHICLE RADIATOR MOUNTING MEANS
Gerald W. Hostetler and Vergil W. Kelley, Fort Wayne, Ind., assignors to International Harvester Company, Chicago, Ill., a corporation of New Jersey
Filed Dec. 7, 1961, Ser. No. 157,702
12 Claims. (Cl. 180—89)

This invention relates to a new and improved motor vehicle radiator mounting means and more particularly to a novel structure for supporting the radiator of a forwardly tilting cab-over-engine type of motor vehicle.

It is generally the practice in the motor truck design field to effectively mitigate the damaging influences of the torsional forces imposed on a chassis frame caused by one or more ground-engaging wheels being elevated differently than the others as when the vehicle is driven over an uneven terrain or road surface irregularities by providing a chassis frame which is relatively flexible and capable of relieving the torsional forces imposed thereon. Obviously, the forwardmost ends of the transversely spaced, longitudinally extending frame side sill members tend to move vertically with respect to each other a greater amount than the amount of relative movement produced between other related sections or portions of the flexible frame when the frame is subjected to torsional or twisting forces. It has also been the practice in the motor truck industry to mount the engine coolant heat exchanger or radiator structure on the chassis frame forwardly of the engine and in a position where it is exposed to the air draft created by the movement of the vehicle which air draft assists the draft created by the engine driven cooling fan in order to insure adequate and efficient cooling of the engine coolant and thus the engine during operation of the vehicle in all atmospheric conditions. Since the engine in conventional motor truck installations is mounted at the forward end of the chassis frame, the radiator structure is secured to the forwardmost ends of the frame side sill members forwardly of and in longitudinal alignment with the engine where the maximum cooling efficiency of the radiator structure is obtained. Heretofore, the radiator structure was secured to the chassis frame in such a manner that very little, if any, relative movement was permitted between the chassis frame and the radiator structure. Consequently, the radiator structure was secured directly to that part of the chassis frame where relative movement is most pronounced when the frame is subjected to distorting forces and shocks and, as a result, the distorting forces and shocks were transmitted directly and fully to the radiator structure causing deformation of the radiator core and other metal parts of the radiator structure and ultimate breakage thereof.

A similar mounting problem was created with the commercial introduction of forwardly tilting cab-over-engine type trucks wherein the cab or operator's compartment is mounted directly over the vehicle propulsion engine or power plant and is capable of tilting forwardly to provide accessibility to the engine appurtenances. It is, therefore, an object of the invention to provide novel means for supporting the engine coolant radiator structure on a part of the motor vehicle which part is resiliently supported on the chassis frame whereby the radiator structure and motor vehicle part are movable with respect to the chassis frame as a structural composite unit in order to mitigate the transmission of forces and vibrations to the radiator structure. The cab mounting structure for a forwardly tilting motor truck cab must not only perform the function of a conventional cab mounting structure which is to secure the vehicle cab to the chassis frame in such a manner that road vibrations are isolated from the cab but it must also provide trunnion means for permitting the vehicle cab to be tilted forwardly with respect to the chassis frame to facilitate engine servicing. Prior to applicants' invention disclosed in U.S. patent application, Serial No. 143,380, filed October 6, 1961, and now Patent No. 3,101,809, entitled Vehicle Cab Mounting Means and assigned to the assignee of the present invention, the cab mounting means for a forwardly tilting cab-over-engine type vehicle involved trunnion members for pivotally connecting the forward end of the vehicle cab directly to the forwardmost end of the chassis frame in a relatively rigid manner. Consequently, the forward end of the vehicle cab, like the radiator structure, was necessarily secured directly to the chassis frame in the vicinity where distortion of the frame is most pronounced when subjected to torsional or twisting forces and shocks, and the trunnion connection means operably provided permitted very little, if any, relative movement between the chassis frame and the vehicle cab when the cab was in its normally lowered and latched position. The aforementioned patent application discloses a novel mounting structure for a vehicle cab of a forwardly tilting cab-over-engine type motor truck which allows a limited but adequate relative movement between the vehicle cab and chassis frame when the cab is in its normally lowered engine-enclosing position whereby the distorting forces, shocks and vibrations to which the chassis frame is subjected are transmitted to a lesser degree than heretofore possible and which structure still permits the vehicle cab to be readily swung forwardly from its normally lowered engine-enclosing position to a forwardlyl tilted position in order to gain access to the engine and engine appurtenances. It is, therefore, a further object of the present invention to provide novel means for mounting an engine coolant radiator structure on a forwardly tiltable cab-over-engine type vehicle cab which vehicle cab, in turn, is resiliently supported on the chassis frame in the manner set forth in the aforementioned patent application whereby the vehicle cab and radiator structure are capable of moving with respect to the frame as a structural composite unit to accommodate twisting of the frame in order to mitigate the transmission of forces, shocks and vibrations thereto, and which radiator structure mounting means permits the vehicle cab to be tilted with respect to the chassis frame in the normal manner and in no way hampers the tilting operation.

A still further object is to pivotally support the radiator structure of a forwardly tilting cab-over-engine type motor vehicle on the vehicle cab in such a manner that the vehicle cab is capable of tilting with respect to the radiator structure and chassis frame between a normally lowered engine-enclosing position and a forwardly raised position but which radiator structure is capable of moving in unison with the vehicle cab as a structural composite unit with respect to the chassis frame when the vehicle cab is in its normally lowered position and the chassis frame is subjected to torsional or twisting forces.

Another object is the improved mounting of the radiator structure of a forwardly tilting cab-over-engine motor vehicle which enables the radiator structure to be placed forwardly of the engine and in the best position to insure adequate and efficient cooling of the engine coolant.

Still another object of the invention is to pivotally connect an engine radiator structure to the vehicle cab of a forwardly tiltable cab-over-engine type vehicle cab whereby the pivotal axis of the radiator structure with respect to the vehicle cab coincides with the pivotal axis of the vehicle cab with respect to the chasis frame.

The foregoing and other important objects and desirable features inherent in and encompassed by the invention together with many of the purposes and uses thereof will become readily apparent from a reading of the ensuing description in conjunction with the annexed drawings, in which:

FIGURE 1 is a side elevational view of the forward end of a tilt cab type cab-over-engine motor truck embodying the invention; the cab is shown in its lowered or engine-enclosing position and portions thereof are broken away and in section to better illustrate the invention;

FIGURE 2 is a side elevational view similar to FIGURE 1 with the exception of the position of the operator's compartment or cab which is shown in its raised or forwardly tilted position;

FIGURE 3 is a front elevational view; and

FIGURE 4 is an enlarged perspective view of the connection of the forward end of one side of the cab to the chassis frame and the connection of one side of the radiator structure to the vehicle cab.

Referring to the drawings in detail, wherein like reference characters represent like elements throughout the various views, there is shown the forward portion of a motor truck chassis frame 10 which includes a pair of transversely spaced, longitudinally extending channel shaped side sill members 11 and 12 which are interconnected by transversely extending longitudially spaced cross members (not shown).

The rearwardly disposed end of the chassis frame 10 is supported off the ground by the power driven ground engaging wheels (not shown) which are resiliently connected thereto by springs (not shown) in a conventional manner. It is to be understood that non-essential details not material to practice the invention have been eliminated and are not shown in order to clearly illustrate the invention. The forward end of the chassis frame 10 is supported by means of steerable ground engaging wheels 13 partially shown in FIGURES 1, 2 and 3.

The vehicle power plant or engine, designated generally by numeral 14, is connected to the chassis frame by means of rubber pads or the like, not shown, in a conventional manner whereby metal-to-metal contact between the engine 14 and the chassis frame 10 is prevented. The engine 14 is mounted adjacent the forward end of the chassis frame 10 and centrally thereof. Suitable power transmission means (not shown) such as change speed transmission mechanism, differential gearing, etc., are employed to drivingly interconnect the engine 14 and the rear ground engaging wheels. The engine 14 is of any conventional heavy duty multi-cylinder water cooled type. Cooling water is supplied to the engine 14 through a conduit 15 interconnecting the lower header 16 of a radiator core 17 and the suction side of a circulating water pump 18. The radiator structure, designated generally by numeral 19, also includes an upper header 20 which has one end of a flexible coolant return conduit 21 connected thereto. The opposite end of the conduit 21 is secured to the upper forward portion of the engine 14 in a conventional manner. It will be noted that the radiator structure 19 is positioned forwardly of and substantially in longitudinal alignment with the engine 14 as in conventional installations to obtain the maximum cooling efficiency of the radiator structure 19 without the need for complicated and costly duct work. It should also be noted that the radiator structure 19 is disposed in a vertical plane containing the forwardmost terminal end of the chassis frame 10. When the operator's compartment or cab, designated generally by the numeral 22, is in its normal lowered, engine-enclosing position, as shown in FIGURE 1, cooling air is drawn through the radiator structure 19 and around the engine 14 by an engine driven fan 23 longitudinally spaced intermediate the engine 14 and the radiator structure 19.

The operator's compartment 22 includes a back panel 24 joined to a roof 25 which, in turn, is connected to a windshield frame 26. The windshield frame 26 is integrally formed with a depending front panel 27. A pair of doors 28 are pivotally mounted to door pillar posts, not shown, adjacent the transverse edges of the front panel 27. The vehicle cab frame, which is utilized to interconnect the various body parts enumerated above to increase the strength and rigidity of the assembled operator's compartment 22 includes suitable braces and ribs, not shown, and a pair of longitudinally extending, transversely spaced members 29. Extending transversely outwardly from the forwardmost ends of the longitudinally extending cab frame members 29 are outriggers 32. Running the length of the operator's compartment 22 along the lower edge of each side thereof is a fender section 33, each of which cooperates with a transversely extending panel 34 to form a fender or wheel covering for one of the steerable wheels 13. The panels 34 are fixed to the chassis frame in a suitable manner.

Secured to the underside of the cab frame at the innermost end of each outrigger 32 is a depending trunnion element 35. The lower end of each trunnion element 35 is provided with an opening therethrough which is defined by a spherically curved concave surface 36. The outer spherical surface 37 of a ball element 38 is adapted to be seated upon the concave surface 36 of each trunnion element 35. A retainer 39 having a complementary spherically curved concave surface 40 is suitably fastened to the lower end of each trunnion element 35 in order to maintain the ball elements 38 connected to the trunnion elements 35. Each ball element 38 is fixedly connected to the outermost end of a transversely inwardly extending leg 41 of a substantially L-shaped bellcrank 42. Each bellcrank 42, in turn, is pivotally connected to the chassis frame 10 by means of a U-shaped bracket 43 and a pivot pin 47 for relative pivotal movement about a longitudinally extending substantially horizontal axis. Each bracket 43 is secured to a respective side sill member 11, 12 with the longitudinally spaced and parallel legs 45, 46 thereof extending transversely outwardly and vertically upwardly. Each pair of legs 45, 46 carry the pivot pin 47 adjacent their uppermost ends. Each pivot pin 47 extends through a bearing 48 formed in each bellcrank 42 at the juncture of the horizontally extending leg 41 and the vertically extending leg 49 thereof. The bellcranks 42 are interconnected by means of a horizontal transversely extending rod 50. The lowermost end of each vertically extending leg 49 is provided with a bifurcated end portion 51. Each end portion of the rod 50 is received between the bifurcations of a respective end portion 51 and a pivot pin 52 is utilized to connect each end portion of the rod and an end portion 51 of a respective vertically extending leg 49 whereby the bellcranks 42 are operatively connected together. From the foregoing, it will be appreciated that the operator's compartment 22 is capable of pivoting with respect to the chassis frame 10 about a transversely extending horizontal axis passing through the ball elements 38 from a normally lowered engine enclosing position, shown in FIGURE 1, to a raised forwardly tilted position illustrated in FIGURE 2. It will also be appreciated that the bellcrank 42 are constrained to pivot in unison and in the same direction with respect to the chassis frame 10. When the operator's compartment 22 is in the position shown in FIGURE 1, the front end thereof is supported by the chassis frame 10 through the intermediary of the trunnion elements 35, bellcranks 42, ball elements 38, brackets 43 and the rod 50. A channel shaped upright member 53 rearwardly spaced from a respective bracket 43 is fastened to the top flange of each side sill member 11 and 12. The uppermost end of each member 53 is provided with a pad 54 of resilient material such as rubber or the like. The rearwardmost end of the operator's compartment 22 is supported by the chassis frame 10 through the intermediary of the resilient pads 54 and the upright members 53. The resilient pads 54 also functoin as stablizers for maintaining the operator's compartment 22 upright when in its normally lowered position and preventing excessive oscillation or movement of the cab 22 with respect to the chassis frame 10. Suitable quick releasable latch means (not shown) are provided for latching the operator's compartment 22 in its normally lowered, engine-enclosing position shown in FIGURE 1 with the rearwardmost end of the cab underside firmly pressed into an abutting engagement with the resilient pads 54. When the latch mechanism is released the operator's compartment 22 is free to be swung forwardly about a pivotal axis defined by a transversely extending line passing through the ball elements 38 interconnecting the trunnion elements 35 and the bellcranks 42 which line lies in a substantially horizontal plane when the vehicle is stopped or traversing a level road bed. Power actuated means in the form of a hydraulic piston and cylinder unit 55 having one end pivotally connected to the underside of the vehicle operator's compartment 22 and its opposite end pivotally connected to the chassis frame 10 is utilized to provide the effort required to swing the operator's compartment forwardly from its normally lowered, engine-enclosing position.

From the foregoing it will be appreciated that the mechanism described above for connecting the forward end of the operator's compartment 22 to the chassis frame 10 permits the operator's compartment to lean or tilt to one side or the other once the rear of the cab is released and is being raised unless the operator's compartment 22 is prefectly balanced, which is seldom, if ever, the case since the pivotal axis of the cab extending through the ball elements 38 will not remain horizontal as desired. To obviate this undesirable characteristic of the forward mounting means, a lock in the form of a pin 56 is provided for preventing the bellcranks 42 from pivoting about the pivot pins 47 as the operator's compartment 22 is being tilted about the transversely extending pivotal axis of the cab through the ball elements 38 and for maintaining the pivotal axis in a horizontal plane. The pin 56 is adatped to be inserted in a longitudinally extending bore 57 provided in the leg 45 of one of the U-shaped brackets 43 and extend through a registerable bore 58 formed through the vertical leg 49 of an associated bellcrank 42. The bores 57, 58 are in longitudinal alignment when the cab piovtal axis lies in a horizontal plane. It is to be understood that other devices or mechanism could be provided for clamping or locking the bellcranks 42 to the chassis frame 10 without departing from the spirit and scope of the invention.

As best shown in FIGURE 3, a plate-like bracket 59 is secured as by welding or the like to the radiator core 17 intermediate the top and bottom thereof. Each bracket 59 is provided with a cylindrical bearing section 60 in which a pivot pin 61 is rotatably journalled. Each pivot pin 61 is carried by a depending extension 62 integrally formed with a respective trunnion element 35. The longitudinal axes of the pivot pins 61 are coincident with the pivotal axis of the operator's compartment 22 extending through the ball elements 38. From the foregoing it will be appreciated that the radiator structure 19 is supported on the operator's compartment 22 rather than on the chassis frame 10, as in conventional motor vehicles, and is capable of pivoting relatively to operator's compartment 22 about a transverse horizontal axis through the pivot pins 61 which is coincident with the pivotal axis of the operator's compartment 22. In order to maintain the radiator structure 19 upright and in its operative position, a stabilizer rod 63 is provided which extends between and is attached to an upper portion of the radiator structure 19 and a rearwardly disposed part of the vehicle engine 14. From the foregoing it will be obvious that the entire weight of the radiator structure 19 is transmitted to the operator's compartment 22 through the pivot pins 61 and the structure connecting the pivots 61 to the operator's compartment 22 described above.

In operation when it is desired to raise the operator's compartment 22, the lock pin 56 is inserted through the registering bores 57 and 58 and the piston and cylinder assembly 55 is expanded after the rear latch means is released. The operator's compartment 22 then pivots forwardly with respect to the chassis frame 10 about the transversely extending horizontal axis extending through the ball elements 38 to its fully raised position. Inasmuch as the pivotal axis of the connection of the radiator structure 19 to the operator's compartment 22 is coincident with the pivotal axis of the operator's compartment the radiator structure 19 remains in its normally upright position and is not disturbed by the pivotal movement of the operator's compartment. In order to lower the operator's compartment 22 the above procedure is reversed and once the cab latch means is secured the lock pin 56 is removed from engagement with the bores 57 and 58. Link means (not shown) are provided to limit the swing of the operator's compartment 22 from its normally lowered position and to establish the fully raised position thereof.

In normal operation of the vehicle on a comparatively level and smooth road bed the chassis frame twist is practically non-existent. Assuming that the vehicle cab 22 is in its normally lowered engine-enclosing position, the entire weight thereof is transmitted to the chassis frame 10 through the two transversely spaced resilient pads 54 at the rearward end of the cab and the two transversely spaced bellcranks 42 at the forward end of the operator's compartment. Thus the cab 22 is connected to the chassis frame 10 at four points. The horizontal component of force applied to one bell crank 42 by the weight of the operator's compartment 22 nullifies the horizontal force component applied to the other bellcrank 42 by the weight of the operator's compartment transmitted thereto through the rod 50 which is placed in tension. The front cab mounting structure described hereinbefore is actually a two-point mounting means since the operator's compartment 22 is in reality connected to the chassis frame 10 at two transversely spaced points at the forward end thereof but which functions as a single point cab mounting means when the chassis frame 10 is subjected to severe twisting conditions. The virtual center, indicated by reference character 64, of the front cab support mechanism or structure described hereinbefore is at the intersection of a transversely extending line passing through the ball elements 38 and intersecting a vertical plane containing the longiutdinal median line of the chassis frame 10. The virtual center 64 is also the point about which the cab support structure permits the forward end of the cab 22 to rock or roll with respect to the chassis frame 10. In other words the front mounting structure permits the operator's compartment 22 to pivot with respect to the chassis frame 10 about a longitudinal axis extending through the virtual center 64. As stated hereinbefore the quick releasable latch means at the rearward end of the cab 22 when latched maintains the rearward end of the cab in abutting engagement with the resilient pads 54 and the pads 54 function as stabilizers to prevent excessive rocking or rolling of the cab 22 with respect to the chassis frame 10 about a longitudinal axis passing through the virtual center 64 of the cab front mounting structure. It will be appreciated also that the cab 22 is maintained in a relatively fixed upright position with respect to the chassis frame 10 by virtue of the fact that the rearward end of the cab is pressed firmly into abutting engagement with the resilient pads 54 when latched in its normally lowered engine-enclosing position. Twisting or flexing of the chassis frame 10 wherein the forward end of one of the side sill members 11 and 12 is raised with respect to the other side sill member 11, 12 is effectively accommodated without imposing severe damaging strains on the sheet metal parts of the vehicle cab structure 22. As an example, if the forward end indicated by numeral 65 in FIGURE 1 of the side sill member 11 is suddenly displaced vertically upwardly with respect to the side sill member 12 the resulting force is not transmitted to the vehicle cab structure 22 to torsionally distort the same. The U-shaped bracket 43 attached to the side sill member 11 as well as the bellcrank 42 which is connected to the bracket by means of the pivot pin 47 are also displaced vertically upwardly with respect to the forward end of the side sill member 12 by virtue of the ball and socket connection between the bellcrank 42 and the trunnion element 35 and the pivotal connection of the bellcrank 42 with the bracket 43. The forward end 65 of the side sill member 11 is permitted to approach the underside of the operator's compartment 22 by pivoting of the bellcrank 42 in a counterclockwise direction as viewed in FIGURE 3. When this occurs the bellcrank 42 operatively connected to the forward end of the side sill member 12 also pivots in a counterclockwise direction the same amount because of the connection between the bellcranks 42 provided by the transversely extending rod 50. Thus, the operator's compartment 22 is maintained in a substantially upright position even though the forward ends of the side sill members 11 and 12 are being displaced vertically with respect to each other. In other words the front cab mounting structure permits the operator's compartment 22 to pivot about the virtual center 64 with respect to the chassis frame 10 and thus relative movement between the operator's compartment and the forward end of the chassis frame by twisting of the chassis frame is effectively accommodated and has very little, if any, damaging influence on the operator's compartment. Once the vehicle has passed over the road bed irregularity the vehicle cab 22 assumes its normal upright steadied position by simultaneous clockwise pivoting of the bellcranks 42 to the position shown in FIGURE 3. It is believed obvious that a minimum of road shock is transmitted to the vehicle cab structure 22 by mounting the vehicle cab as described above. The damaging forces are effectively dissipated by the capability of the forward end of the chassis frame 10 to twist relatively to the operator's compartment 22. As pointed out above the capability of the cab 22 to rock relatively to the chassis frame 10 is brought about by the novel construction and arrangement of the four point mounting means which functions as a three point mounting whenever the chassis frame 10 is torsionally distorted. It will also be appreciated that by using the ball and socket principle in the front cab mounting structure a trunnion means is provided for permitting forwardly tilting of the cab to gain access to the engine. The invention pertaining to the novel structure for supporting a vehicle cab on a chassis frame is disclosed and claimed per se in applicants' U.S. Patent No. 3,101,809, entitled Vehicle Cab Mounting Means and assigned to the assignee of the present invention.

While the structure described hereinbefore for interconnecting the operator's compartment 22 and the radiator structure 19 is actually a two-point mounting means since the radiator structure is in reality connected to the operator's compartment at two transversely spaced points, such structure functions as a single point radiator structure mounting means with respect to the chassis frame 10 when the chassis frame 10 is subjected to severe twisting conditions. That single point is the same as the vertical center 64 of the front cab support structure. From the foregoing it will be appreciated that inasmuch as the forward ends of the side sill members 11, 12 are capable of moving relatively to the operator's compartment 22 and since the radiator structure 19 is carried by the operator's compartment in the novel manner set forth above, the radiator structure and operator's compartment are capable of moving relatively with respect to the chassis frame 10 as a structural composite unit. Consequently, not only the operator's compartment 22 but the radiator structure 19 as well is isolated from the forces and vibrations to which the chassis frame 10 is subjected. Thus, the distorting forces and shocks which were heretofore transmitted directly and fully to the radiator structure 19 causing deformation of the radiator core 17 and the other metal parts of the radiator structure and ultimate breakage thereof are dissipated even though the radiator structure 19 is positioned forwardly of the engine 14 and in the vicinity of the chassis frame 10 where relative movement between the chassis frame 10 and the radiator structure 19 is most pronounced when the chassis frame 10 is subjected to distorting forces and shocks. Furthermore, the radiator structure mounting means permits the vehicle cab 22 to be tilted with respect to the chassis frame 10 in the normal manner and in no way hampers the tilting operation.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated therefore that the particular structural and functional aspects emphasized herein are not intended to exclude, but rather to suggest such other adaptations and modifications of the invention as fall within the spirit and scope of the invention as defined in the appended claims.

What is claimed is:

1. In a motor vehicle having a chassis frame and a body connected to said frame for controlled relative movement with respect thereto about a longitudinal axis an engine coolant radiator structure; and means for supporting said radiator structure on said body whereby said radiator structure and said body move in unison relatively to said chassis frame as a structural composite unit when said body moves with respect to chassis frame about said axis, including pivot connecting means between said body and radiator structure, the axis of said pivot connection means being substantially normal to said first mentioned axis.

2. In a motor vehicle having a longitudinal chassis frame and a body connected to said frame for controlled relative movement with respect thereto about a longitudinally extending axis an engine coolant radiator structure; and means for operatively connecting said radiator structure to said body whereby said radiator structure and said body move in unison relatively to said chassis frame as a structural composite unit when said body moves with respect to said chassis frame about said longitudinally extending axis.

3. In a motor vehicle including a chassis frame and a body; body mounting means operatively interconnecting a portion of said body to said frame whereby said body is capable of moving relatively with respect to said frame about a longitudinally extending axis an engine coolant radiator structure; and mounting structure operatively interconnecting said radiator structure and said frame for universal pivotal movement about a single point contained in a vertical plane passing through the longitudinal median line of said frame, said mounting structure including said body mounting means.

4. In a motor vehicle having a chassis frame and an operator's compartment mounted on said frame for pivotal movement about a transversely extending horizontal axis between a normally lowered position and a forwardly raised tilted position; an engine radiator structure; and means for connecting said radiator structure to said operator's compartment for pivotal movement with respect to said operator's compartment about a transversely extending horizontal axis coincident with said pivotal axis of said operator's compartment whereby said radiator structure is capable of remaining stationary with respect to said frame when said operator's compartment is pivoted between its normally lowered and forwardly raised tilted positions.

5. In a motor vehicle having a longitudinal chassis frame and an operator's compartment mounted on said frame for pivotal movement about a transversely extending horizontal axis between a normally lowered position and a forwardly raised tilted position, said operator's compartment being connected to said frame for controlled relative movement therebetween when in its normally lowered position about a longitudinally extending axis; an engine radiator structure; and means for operatively connecting said radiator structure to said operator's compartment including means pivotally connecting said radiator structure to said operator's compartment for relative pivotal movement about a transversely extending axis fixed with respect to said operator's compartment whereby said radiator structure and operator's compartment are capable of moving in unison as a structural composite unit with respect to said frame about said longitudinally extending axis when said operator's compartment is in its normally lowered position, said means further permitting said radiator structure to remain stationary with respect to said frame when said operator's compartment is pivoted between its normally lowered position and its forwardly raised tilted position.

6. In a motor vehicle having a longitudinal frame and a body, the combination including said frame and body comprising, means for supporting said body on said frame including mounting structure operatively interconnecting the forward end of said body to said frame for universal pivotal movement about a single point contained in a vertical plane passing through the longitudinal median line of said frame; an engine coolant radiator structure; and mounting means operatively interconnecting said radiator structure and said frame for universal pivotal movement about said single point, said mounting means including said body mounting structure.

7. In a motor vehicle as set forth in claim 6 wherein said body mounting structure permits said body to be swung between a normally lowered position and a forwardly raised tilted position about a transversely extending horizontal axis extending through said single point, and said radiator structure mounting means includes means for pivotally connecting said radiator structure to said body for relative pivotal movement about a transversely extending horizontal axis coincident with said pivotal axis of said body whereby said radiator structure is capable of remaining stationary with respect to said frame when said body is swung between its normally lowered and forwardly raised tilted positions.

8. In a motor vehicle having a longitudinal frame and a body, the combination including said frame and body comprising, means for mounting said body on said frame for pivotal movement about a transversely extending horizontal axis between a normally lowered latched position and a forwardly raised tilted released position, said mounting means permitting universal pivotal movement of the forward end of said body about a single point contained in a vertical plane passing through the longitudinal median line of said frame with respect to said frame when said body is in its latched position; an engine coolant radiator structure; and mounting means operatively interconnecting said radiator structure and said frame for universal pivotal movement about said single point whereby said radiator structure and body are capable of moving in unison of a structural composite unit with respect to said frame when said body is in its normally lowered latched position, said radiator mounting means including said body mounting structure and further including means for pivotally connecting said radiator structure to said body for relative pivotal movement about a transversely extending horizontal axis coincident with said pivotal axis of said body whereby said radiator structure is capable of remaining stationary with respect to said frame when said body is pivotally moved between said normally lowered latched and forwardly raised tilted released positions.

9. A cab-over-engine motor truck having a chassis frame; an engine mounted on the forward end of said frame; a cab; means for mounting said cab on the forward end of said frame including resilient means for connecting the rearward end of said cab to said frame and mounting structure operatively interconnecting the forward end of said cab to said frame including a pair of transversely spaced levers, each lever having one end connected to said cab for universal pivotal movement and a portion intermediate the ends thereof connected to said frame for pivotal movement about a longitudinally extending axis, said mounting structure further including a transversely extending rod having each end thereof pivotally connected to a respective lever whereby said levers are constrained to pivot in unison with respect to said frame in the same direction, said means for mounting said cab on the forward end of said frame permitting pivotal movement about a transversely extending axis extending through said lever ends connected to said cab for universal pivotal movement between a normally lowered latched position and a forwardly raised tilted released position; a substantially rectangular engine coolant radiator structure spaced forwardly of said engine in a generally upright position; and means for pivotally connecting said radiator structure to said cab for relative pivotal movement about an axis extending through the ends of said levers connected to said cab for universal pivotal movement whereby said radiator structure is capable of remaining stationary with respect to said frame when said cab is pivoted between its normally lowered latched position and its forwardly raised tilted released position with respect to said frame.

10. A cab-over-engine motor truck as set forth in claim 9, and further including stabilizer means extending longitudinally between said radiator structure and said engine for maintaining said radiator structure in its upright position when said cab is pivoted between its normally lowered latched and forwardly raised tilted released positions.

11. In a cab-over-engine motor truck as set forth in claim 10, wherein the pivotal axis of said radiator structure provided by said means for pivotally connecting said radiator structure to said cab for relative pivotal movement extends transversely and is vertically spaced intermediate the top and bottom of the radiator structure.

12. In a motor vehicle having a longitudinal frame; an engine mounted on the forward end of said frame; an operator's compartment; means for mounting the forward end of said operator's compartment on said frame for controlled relative movement therebetween about a longitudinally extending axis; a radiator structure for said engine disposed forwardly thereof; means for operatively connecting said radiator structure to said operator's compartment including said means for mounting the forward end of said operator's compartment on said frame whereby said radiator structure and the forward end of said operator's compartment move in unison as a structural composite unit with respect to said frame as said operator's compartment moves with respect to said frame about said longitudinally extending axis.

References Cited in the file of this patent

UNITED STATES PATENTS

| 883,146 | Noble | Mar. 24, 1908 |
| 1,623,473 | Gurney | Apr. 5, 1927 |
| 2,912,057 | Wagner | Nov. 10, 1959 |
| 3,051,259 | Lorenz | Aug. 28, 1962 |

FOREIGN PATENTS

| 841,233 | Great Britain | July 30, 1960 |